May 31, 1938.  H. F. MORSE  2,119,398
COMBINED CEILING FAN AND LIGHT
Filed Sept. 28, 1937
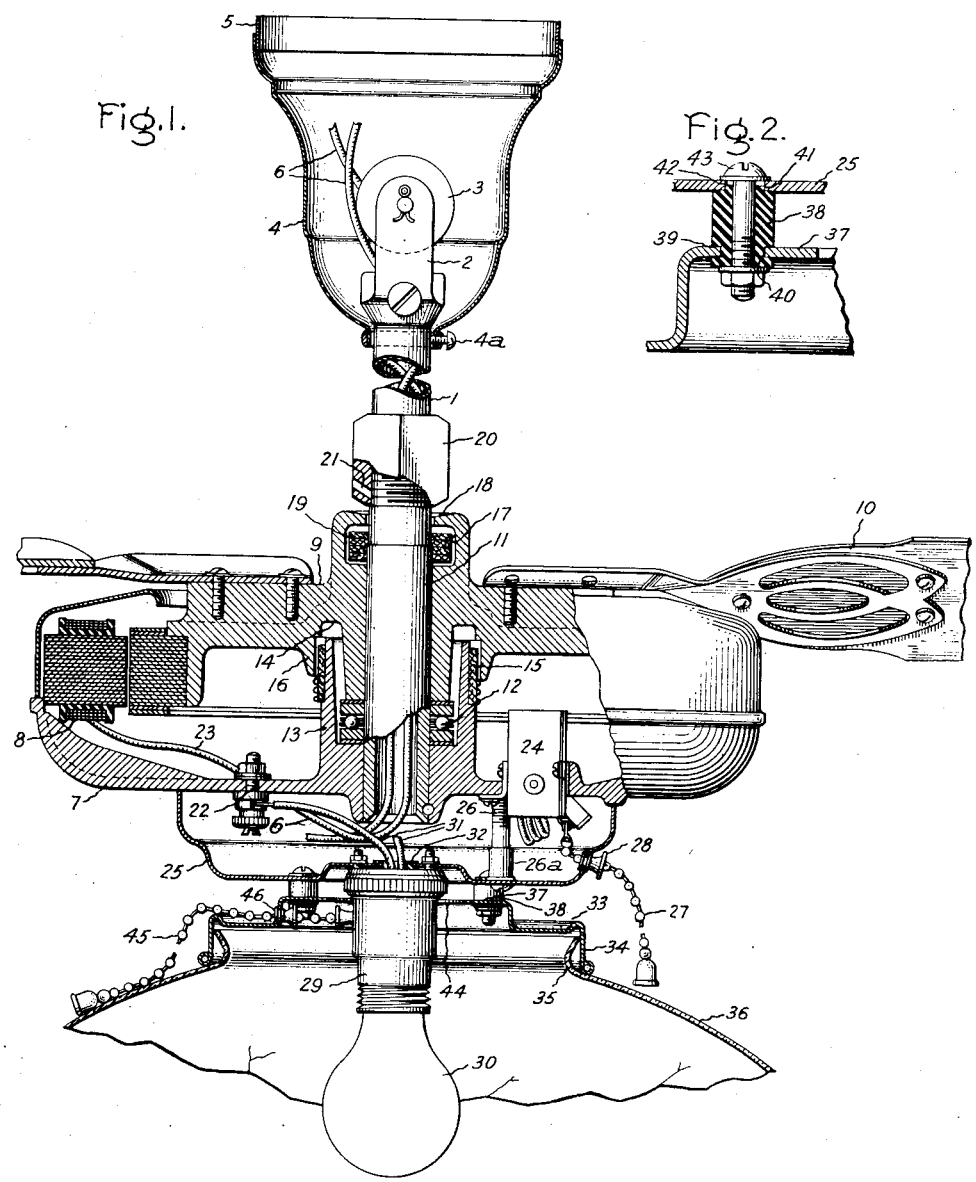
Inventor:
Harold F. Morse,
by Harry E. Dunham
His Attorney.

Patented May 31, 1938

2,119,398

UNITED STATES PATENT OFFICE 2,119,398

COMBINED CEILING FAN AND LIGHT

Harold F. Morse, Southport, Conn., assignor to General Electric Company, a corporation of New York Application September 28, 1937, Serial No. 166,091

5 Claims. (Cl. 230—249.5)

The present invention relates to ceiling fans of the type having a light at the lower end thereof.

The object of my invention is to provide an improved construction and arrangement in fans of this type having among other advantages ease of installation and wiring.

For a consideration of what I believe to be novel and my invention, attention is directed to the following description and the claims appended thereto.

In the accompanying drawing, Figure 1 is a sectional elevation of a fan embodying my invention, and Figure 2 is an enlarged sectional view of the resilient support for the lamp shade.

Referring to the drawing, there is shown a ceiling fan having tubular support 1 provided with forked upper ends 2 between which is pivotally carried a roll 3 which is adapted to rest in the curved end of a supporting hook (not shown) suspended from a ceiling adjacent an outlet (not shown). Fastened to the support by a set screw 4a is a shell 4 which fits over an insulating ring 5 and encloses the hook and outlet. Line conductors 6 leading from the outlet are extended downward through the support which serves as a conduit.

At the lower end of the tubular support is carried an electric motor comprising a stator 7 fixed to the support and carrying field coils 8 and a rotor 9 on the upper side of which are fixed fan blades 10. The rotor has a sleeve 11 rotatable on the support. Between the lower end of the sleeve 11 and the stator is a ball thrust bearing 12. Cylindrical walls 13 on the stator, which extend upwardly into an annular recess 14 in the rotor, provide an oil cup holding lubricant for lubricating the thrust bearing 12. On the outside of the upper end of the walls 13 is arranged a packing 15 which cooperates with the inner surface of cylindrical walls 16 on the rotor and prevents leakage of dust into the bearing 12. At the upper end of the sleeve 11 is a recess 17 having inwardly extending walls 18 at the top. In this recess are oil filled felt packing washers 19 to lubricate rotatable sleeve 11. The rotor is held on the support by a nut 20 threaded on the support, the nut being fixed thereto by conventional set-screws. The washers 19 are lubricated through hole 21.

On the under side of the stator are binding posts 22 (only one of which is shown) to which are connected the line conductors 6. The binding posts serve as motor terminals, the inner ends thereof projecting inside the stator and being connected by conductors 23 to the motor windings. Also carried on the under side of the stator is a pull switch 24 suitably connected (in a manner not shown) in the motor circuit so as to control the operation of the fan. The binding posts 22, and the switch 24 are enclosed by a cup-shaped cover plate 25 secured to the under side of the stator by screws 26 extending through sleeves 26a and integral with the cover plate. The pull chain 27 of the pull switch extends outward through the cover plate 25 through a bushing 28 fixed in the cover plate.

On the under side of the cover plate 25 is bolted a pull chain lamp socket 29 in which is mounted an electric light bulb 30. Conductors 31 extend from the lamp socket terminals through a bushing 32 of insulating material in the cover plate 25 into the space between the cover plate and the lower side of the stator. The conductors 31 are connected to the binding posts 22 (only one of the connections being shown). On the under side of the cover plate 25 is a shade holder 33 having a depending circular flange 34 carrying screws (not shown) which are threaded into a groove 35 in a shade 36 supporting the shade. The construction for supporting the shade is well known and further illustration thereof is not deemed necessary. In the top wall 37 of the shade holder are rubber bushings 38 having grooves 39 therein into which fit the edges of openings 40 in the top wall of the shade holder. The upper ends of the bushings 38 have annular projections 41 which fit within the edges of openings 42 in the cover plate. Extending through the bushings are bolts 43 which bolt the shade holder to the cover plate, the bushings being clamped therebetween. With this construction the shade holder is resiliently supported with respect to the fan and there is accordingly no danger of breaking the shade or jarring it loose from its holder by vibration of the fan. The top wall of the shade holder is provided with a clearance opening 44 around the lamp socket 29 and is also provided with openings (not shown) through which a screw driver may be inserted to thread the screws 26 into the under side of the stator 7. The pull chain 45 of the lamp socket extends outward through a bushing 46 fixed in the shade holder.

This fan construction is particularly adapted for use either with or without a light, and is very easily installed. In the installation the roll 3 at the upper end of the support is hooked over the supporting hook and the line conductors 6 are extended downward through the support and the lower ends are connected to the binding posts 22. The other connections to the motor windings and pull switch 24 are permanently made within the stator. If the fan is to be used without a light the cover plate 25 is attached to the stator covering the binding posts 22 and the pull switch 24. If the fan is to be used with a light, the shade holder 33 and the lamp socket 29 are assembled to the cover plate 25, the leads 31 from the lamp socket extending upward through the bushing 32. The leads 31 are then connected to the binding posts 22 and thereafter the assembly is secured to the under side of the stator by the screws 26.

What I claim as new and desire to secure by Letters Patent of the United States, is:

1. In a ceiling fan, a depending tubular support serving as a conduit, an electric motor carried thereby comprising a stator fixed to the support and a rotor above the stator and rotatable around the support, fan blades carried by the rotor, a pull switch and motor terminals for connection with line conductors extending downward through the support carried on the under side of the stator, and a cover plate for the switch and terminals having an opening through which the pull member of the switch extends.

2. In a ceiling fan, a depending tubular support serving as a conduit, an electric motor carried thereby comprising a stator fixed to the support and a rotor above the stator and rotatable around the support, fan blades carried by the rotor, a pull switch and motor terminals for connection with line conductors extending downward through the support carried on the under side of the stator, a cover plate for the switch and terminals having an opening through which the pull member of the switch extends, and a lamp socket and shade supported from the cover plate, said lamp socket being connected to said terminals by conductors extending through the cover plate.

3. In a ceiling fan, a depending tubular support serving as a conduit, an electric motor carried thereby comprising a stator fixed to the support and a rotor above the stator and rotatable around the support, fan blades carried by the rotor, a pull switch and motor terminals for connection with line conductors extending downward through the support carried on the under side of the stator, a cover plate for the switch and terminals having an opening through which the pull member of the switch extends, and a lamp socket and shade supported from the cover plate, said shade being resiliently supported and said socket being connected to said terminals by conductors extending through the cover plate.

4. In a ceiling fan, a depending tubular support serving as a conduit, an electric motor carried thereby comprising a stator fixed to the support and a rotor above the stator and rotatable around the support, fan blades carried by the rotor, a pull switch and motor terminals for connection with line conductors extending downward through the support carried on the under side of the stator, and a lamp socket and shade supported from the under side of the stator, said socket being connected to said terminals.

5. In a ceiling fan, a depending tubular support serving as a conduit, an electric motor carried thereby comprising a stator fixed to the support and a rotor above the stator and rotatable around the support, fan blades carried by the rotor, a pull switch and motor terminals for connection with line conductors extending downward through the support carried on the under side of the stator, and a lamp socket and shade supported from the under side of the stator, said shade being resiliently supported and said socket being connected to said terminals.

HAROLD F. MORSE.